June 20, 1944.  E. E. ARNOLD  2,351,900

GROOVED TROLLEY WIRE SPLICER

Filed Jan. 28, 1942

WITNESSES:
N. F. Susser
F. V. Giolma

INVENTOR
Edwin E. Arnold.
BY G. M. Crawford
ATTORNEY

Patented June 20, 1944

2,351,900

UNITED STATES PATENT OFFICE 2,351,900

GROOVED TROLLEY WIRE SPLICER

Edwin E. Arnold, Pittsburgh, Pa., assignor to Westinghouse Electric & Manufacturing Company, East Pittsburgh, Pa., a corporation of Pennsylvania Application January 28, 1942, Serial No. 428,537

10 Claims. (Cl. 191—44.1)

My invention relates, generally to trolley wire splicers, and it has reference, in particular, to splicers for grooved trolley wires.

Generally stated, it is an object of my invention to provide a trolley wire splicer that is of simple, reliable and rugged construction, inexpensive to manufacture, and which may be readily and economically installed.

More specifically, it is an object of my invention to provide for securing grooved trolley wires in a partially open groove in a body member by means of transverse holding means which may be positioned in the body member from the side thereof to interfere with the upper portion of the trolley wire in the groove.

It is also an object of my invention to utilize substantially horizontal transversely movable locking members in a splicer having axes a predetermined distance above the axis of the trolley wire so as to produce only a predetermined maximum amount of interference with the upper portion of the trolley wire.

Another object of the invention is to provide for utilizing fluted drive pins positioned in transverse openings at different distances above the trolley wire so as to secure different degrees of interference between the sides of the pins and the upper surface of the trolley wire.

Yet another object of the invention is to provide a wire splicer having transverse holding means so positioned therein from the sides thereof that the degree of interference with the trolley wire is substantially independent of the actual position of the holding means.

A further object of the invention is to provide for predetermining the degree of interference of the holding means in a trolley wire splicer so as not to leave it up to skill or the judgment of the workmen installing the splicer.

Still another object of the invention is to provide for distributing the holding force between the body of the splicer and the trolley wire in proportion to the distance of the holding means from the ends of the splicer.

Other objects will, in part, be obvious and will, in part, be explained hereinafter.

In accordance with my invention, a simple and effective grooved wire splicer may be provided which is inexpensive to manufacture and is easy to install. The body of the splicer may be of a suitably high strength metal having a longitudinal groove along the lower edge partially enclosed by inwardly projecting lips which may be positioned in the grooves of a grooved trolley wire to prevent downward or sideways movement of the wire relative to the body member. Openings are provided in the body member from the sides at spaced intervals, to intersect with the upper portion of the groove. Drive pins having straight or helical peripheral flutes separated by relatively narrow ribs or fillets may be driven into these openings to cut grooves across the upper portions of the trolley wires and in the sides of the openings so as to lock the trolley wires against longitudinal movement relative to the body member. The openings may be positioned at different distances above the longitudinal axis of the groove substantially in proportion to their distances from the center of the body member, so that the tension load of the trolley wire is applied to the body member progressively in increasing amounts from the ends towards the center.

For a more complete understanding of the nature and scope of my invention, reference may be had to the following detailed description which may be read in connection with the accompanying drawing, in which.

Figure 10:
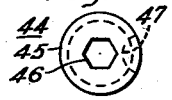
Figure 11:
Figure 12:
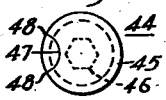
Figure 13:
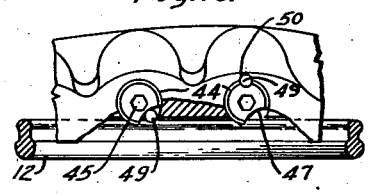

Figs. 10, 11, and 12 are enlarged end and side views of still another form of holding means; and Fig. 13 is a partial side elevational view of a splicer illustrating different applications of the holding means of Figs. 10, 11 and 12.

Figure 1:
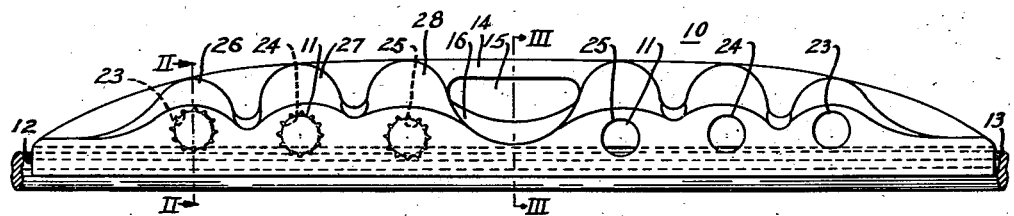
Figure 1 is a side elevational view of a trolley wire splicer embodying the principal features of the invention with the holding means omitted from one end.
Figure 2:
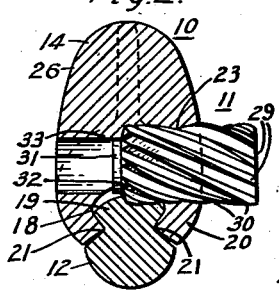
Fig. 2 is an enlarged cross-sectional view taken along the line II—II of Fig. 1 showing the holding means in the form of a drive pin only partially inserted.
Figure 3:
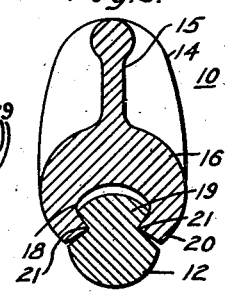
Fig. 3 is an enlarged cross-sectional view taken along the line III—III of Fig. 1.

Referring to Figs. 1, 2 and 3 of the drawing, the reference numeral 10 may denote, generally, a splicer having a plurality of holding means 11 for securing adjacent ends 12 and 13 of grooved trolley wires together so as to provide an uninterrupted trolley wire surface along the lower side of the trolley wires. The holding means securing the wire 13 in the groove have been omitted in order to illustrate different features of the invention more clearly.

The splicer 10 may comprise, generally, an elongated body member 14, having a central web portion 15 with an enlarged body portion 16 adjacent the lower edge. The web may have its greatest depth intermediate the ends and taper towards the ends to provide a streamline splicer. A longitudinal groove 18 may be provided along the lower edge of the body portion 16 for receiving the upper portion 19 of the trolley wire. In order to secure the trolley wire in the groove 18 and prevent downward or sideways movement thereof, suitable means, such as the inwardly projecting lips 20, may be provided along each side of the groove 18 which may be positioned in the opposed grooves 21 of the trolley wire to interlock with the dovetailed upper portion 19 thereof.

In order to secure the trolley wires 12 and 13 in the groove 18 and prevent longitudinal movement thereof relative to the body portion 16, suitable openings 23, 24 and 25 may be provided in the body portion 16 adjacent each end from the sides thereof at spaced intervals to receive the holding means 11. The openings may be so positioned relative to the groove 18 that the holding means when positioned therein interfere with the trolley wires in the groove 18. Bosses 26, 27 and 28 may be provided on each side of the web about the openings to provide additional strength against bending, and provide additional material for effecting interlocking with the holding means.

As shown, the openings 23, 24 and 25 may be transverse with respect to the longitudinal axis of the wires and substantially horizontal. They also may be positioned at different distances above the longitudinal axis of the trolley wires so as to secure different degrees of interference of the holding means with the trolley wires. For example, the openings may be positioned progressively closer to the longitudinal axis of the trolley conductors, towards the central portion of the body member, substantially in proportion to their distances from the central portion of the body member. In this manner, the tension load of the trolley wires may be progressively applied to the body member so as to distribute the loading on the body member more evenly. In addition, the stresses in the trolley wires are applied gradually, and the cross section of the trolley wires is decreased less adjacent the ends by the holding means, so as to prevent breakage thereof where the stresses are greatest.

Figure 4:
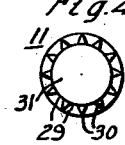
Figs. 4 and 5 are enlarged end and side views, respectively, of one form of drive pin.
Figure 5:
Figure 6:
Fig. 6 is an enlarged side view of another form of drive pin.

Referring to Figs. 2, 4 and 5, it will be seen that the holding means 11 may, for example, comprise hardened drive pins having a plurality of relatively wide flutes 29 about the periphery thereof with relatively narrow ribs or fillets 30 therebetween. The drive pins may be provided with slightly reduced sections 31 adjacent one end, to facilitate insertion of the drive pins in the openings. The cross-section of the drive pins is preferably such that the reduced section fits the opening 23, and the ends of the ribs 30 may be provided with sloping surface portions 32 to permit the drive pins to be driven into the openings in the body member and cut or force their way through the upper portion 19 of the trolley wires and at the same time cut grooves in the side walls 33 of the openings, deforming the material of the wire and body member, rather than removing it, so that the material displaced by the ribs is forced into the flutes. The ribs or fillets 30 may either be helical, as shown in Figs. 2 and and 5, or may be substantially straight, such as the ribs or fillets 34 on the drive pin 35 shown in Fig. 6.

When the drive pins are driven into the openings 23 through 25, with the trolley wires 12 and 13 positioned in the groove 18 of the splicer, the ribs 30 cut across the upper surfaces of the trolley wires and into the side walls of the openings and exert very little downward force on the trolley wires. The wires are not, therefore, required to be held in the groove by entraneous holding means while the drive pins are being inserted. The drive pins are thus secured in the body member of the splicer against further rotation, and the ribs thereof are interlocked with the upper portions of the trolley wires to prevent longitudinal movement of the trolley wires relative to the body member. As the openings are at different distances above the longitudinal axis of the trolley wires, the retaining force is applied to the wires gradually, in increasing amounts towards the center of the body member.

Figure 7:
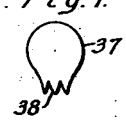
Fig. 7 is an enlarged end view of still another form of drive pin.

Referring to Fig. 7, it will be seen that another form of drive pin indicated by the numeral 37 may be used, if desired, having a substantially pear-shaped section, with a plurality of longitudinal ribs 38 at the smaller end. These ribs function in a similar manner to the ribs 30 of the drive pin shown in Figs. 4 and 5, and cut a path both through the side walls of the groove 18 and through the upper portion of the trolley wire to lock the trolley wire against longitudinal movement in the groove.

Figure 8:
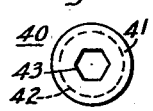
Figs. 8 and 9 are enlarged end and side views, respectively, of a further modified form of holding means.
Figure 9:

Referring to Figs. 8 and 9, the reference numeral 40 may denote, generally, a further modification of holding means which may comprise a substantially cylindrical plug 41 having threads 42 on the outer surface thereof and provided with means such as the hexagonal recess 43 at one end for receiving the end of a suitable wrench. The holding means 40 may be threaded into the openings 23 through 25 in the body of the splicer to cut threads in the side walls of the openings and across the upper surfaces of the trolley wires. Sufficient interference may thus be provided with the trolley wires without materially decreasing their mechanical strength and without exerting sufficient downward pressure on the trolley wires to force them out of the groove to lock the trolley wires in the body portion of the splicer against longitudinal movement.

In Figs. 10, 11 and 12, the reference numeral 44 may denote, generally, still another modification of holding means suitable for use with a body member such as that of the wire splicer 10. The holding means 44 may, for example, comprise a substantially cylindrical plug 45 having a hexagonal recess 46 in one end for a wrench. Suitable means such as the arcuate recess or groove 47 may be provided along one side of the plug so as to form the relatively sharp cutting edges 48 along each side thereof.

The holding means 44 may readily be inserted in the openings 23 through 25 from the side by threading it into the opening with the trolley wire removed. The holding means may be so rotated that the arcuate recess 47 is positioned in the bottom of the opening towards the groove 18, thus allowing clearance for the trolley wires to be inserted in the groove 18. The holding means 44 may then be rotated to the positions shown in Fig. 13, which illustrates a portion of the lefthand end of a splicer, so that the edge portions 48 dig into the upper surface of the conductor 12 and provide relatively abrupt cutting surfaces which resist longitudinal movement of the trolley wire 12 towards the left. Further rotation of the holding means 44 may be prevented in any suitable manner, such as by means of pins 49, which may be driven into the arcuate recess 47 above the trolley wire to wedge the holding means in the desired position. An alternate method of locking the holding means 44 is also shown, wherein the pin 49 may be positioned in a suitable opening 50 to interfere with the periphery of the holding means 44 and the edge of the openings 25.

From the above description and the accompanying drawing, it will be apparent that I have provided a grooved trolley wire splicer of relatively simple construction which is inexpensive to manufacture and is easy to install. The holding means may be easily inserted in the body member in the proper relation to the trolley wires without requiring any experience or skill on the part of the person installing the splicer. A few sharp taps with an ordinary hammer or a few turns with a simple wrench are all that are needed to position the holding means in the splicer. The degree of interference between the holding means and the trolley wire is predetermined since it is dependent solely on the distance of the transverse openings in the body of the splicer above the longitudinal axes of the groove. The distance the holding means is driven into the body member has little or nothing to do with the degree of interference between the holding means and the trolley wire after the holding means is even partially driven to its final position. Thus, the holding force of the splicer may be predetermined and made independent of the skill or judgment of the person using it, providing a strong and thoroughly reliable connection.

Since different embodiments of the invention may be made and certain changes may be made in the above description without departing from the spirit thereof, it is intended that all the matter contained in the above description and shown in the accompanying drawing shall be considered as illustrative and not in a limiting sense.

I claim as my invention:

1. A wire splicer having an elongated open groove along one side with inwardly projecting lips for receiving and partially enclosing a portion of a wire, and a plurality of holding means positioned in the body member from the side having helical cutting edges so shaped as to interlock with the inner surface of the portion of the wire in the groove and the surrounding portion of the body member to prevent longitudinal movement of the wire relative to the body member, and apply no appreciable force to the wire in a direction tending to remove the wire from the groove.

2. A wire splicer comprising, an elongated body member having a substantially open longitudinal slot along one edge with inwardly projecting lips for receiving and partially enclosing a portion of a wire and a plurality of openings from the sides intersecting in different degrees with the upper portion of the slot, and a plurality of drive studs positioned in the openings from the side having a plurality of longitudinal parallel ribs about the peripheries arranged to cut transverse grooves across the upper portion of the wire to lock the wire in the slot against longitudinal movement.

3. A wire splicer comprising, an elongated body member having a partially enclosed longitudinal slot along one edge to receive a portion of a wire and a plurality of substantially horizontal openings intersecting with the upper portion of the slot in progressively increasing amounts towards the central portion of the body member, and holding means having longitudinal cutting edges positioned in said openings with the cutting edges recessed in the upper surface of the wire to prevent withdrawal from the slot.

4. A splicer comprising, an elongated body member having a substantially open wire receiving slot along one edge with inwardly projecting edges to prevent transverse movement of the wire from the slot and a plurality of substantially horizontal transverse openings intersecting the upper portion of the slot from the side positioned at different predetermined distances above the longitudinal axis thereof, and a plurality of fluted drive pins positioned in the openings from the sides, said pins being of such cross-section that the flutes interlock with the sides of the openings and with the upper surface of the wire to prevent relative longitudinal movement of the wire and body member.

5. A splicer comprising, an elongated body member having a partially enclosed wire groove along one edge to receive the upper portion of a wire and inwardly projecting lip portion to retain said portion of the wire in the groove, and a plurality of pins having peripheral ribs with cutting edges movable along transverse axes so positioned above the longitudinal axis of the upper portion of the wire that the ribs on the pins cut grooves across the upper surface of the wire to lock the wire against longitudinal movement in the groove without applying any appreciable force to the wire in a direction perpendicular to the axes of the pins and the wire.

6. The combination in a grooved wire splicer, of an elongated body member having a partially enclosed groove along one edge with lip portions shaped to fit in the wire grooves, and a plurality of transverse openings having their longitudinal axes above the longitudinal axis of the groove, a plurality of drive pins having peripheral cutting edges positioned in said openings arranged to interlock mechanically with the peripheral surface of the wire merely by deforming said peripheral surface, said openings being so positioned relative to the groove as to provide a predetermined maximum interference between the peripheral cutting edges and the upper portion of the wire.

7. A wire splicer comprising, an elongated body member having a partially enclosed groove along one edge for receiving the upper portion of a grooved wire, and a plurality of substantially horizontal transverse openings positioned above the longitudinal axis of the wire receiving groove, and holding means having peripheral cutting edges positioned in said openings, said openings being so positioned that their longitudinal axes are different distances above the axis of the wire receiving groove and the peripheral cutting edges of the holding means interfere with the upper portion of the wire only different predetermined degrees to prevent longitudinal movement of the wire in the groove.

8. A splicer comprising, an elongated body member having an open groove along the lower edge to receive a wire with depending side walls provided with inwardly projecting lip portions to partially enclose the wire and prevent movement thereof in a direction perpendicular to the longitudinal axis of the groove, and a plurality of transverse openings in the body member directed from one side thereof toward the other and having their longitudinal axes at different distances above the longitudinal axis of the open groove, and a plurality of elongated holding means having peripheral cutting means along the body thereof positioned in said openings, said openings being so positioned above the axis of the groove as to provide different predetermined degrees of interference between the cutting means of the holding means and the upper portion of the wire in the groove.

9. A splicer comprising, a body member having a partially enclosed longitudinal slot along one edge to receive a portion of a wire, and a plurality of drive studs having helical ribs about the peripheries positioned in the body member from the side to provide a predetermined degree of interference with the upper surface of the wire without exerting any appreciable force on the wire tending to remove it from the slot.

10. A wire splicer comprising, an elongated body member having a partially enclosed longitudinal slot along one edge to receive a portion of a wire and leave the outer portion open and a plurality of transverse openings through the body member from the side intersecting with the inner portion of the slot only, rotatable holding means positioned in the openings from the side having relatively sharp longitudinal edge portions disposed to cut into the upper surface of the wire and present an abrupt surface to the upper portion of the wire to prevent longitudinal movement of the wire, and means locking the rotatable holding means against further rotation.

EDWIN E. ARNOLD.